Patented Mar. 29, 1949

2,465,505

UNITED STATES PATENT OFFICE 2,465,505

PROCESS FOR THE MANUFACTURE OF 3,4 - DI - (p - HYDROXY - PHENYL) - HEXA-DIENE-2,4

Erich Adler, Lidingo, near Stockholm, Sweden, assignor to Hoffmann-La Roche Inc., Nutley, N. J., a corporation of New Jersey No Drawing. Application September 6, 1945, Serial No. 614,831. In Switzerland December 5, 1944

7 Claims. (Cl. 260—619)

The present invention relates to the manufacture of 3,4-di-(p-hydroxy-phenyl)-hexadiene-2,4. This compound may be manufactured by splitting off 2 mols of water from 3,4-di-(p-hydroxy-phenyl)-hexandiol-3,4 by the action of acetic anhydride and acetyl chloride and subsequent saponification (Dodds et al., Proceedings of the Royal Society, Series B, vol. 127, year 1939, page 162). However, the yield of this process only amounts to 25-30 per cent.

It has now been found that the 3,4-di-(p-hydroxy-phenyl)-hexandiol-3,4 described by Dodds et al. consists of a mixture of the stereoisomeric meso and racemic forms, and further, that the yield of the said diene may substantially be raised if in place of a mixture of the stereoisomers the pure meso or the pure racemic form of 3,4-di-(p-hydroxy-phenyl)-hexandiol-3,4 or the corresponding 3,4-di-(p-acyloxy-phenyl)-hexandiol-3,4 is used as the starting material. By boiling with the anhydride and the chloride of a lower aliphatic carboxylic acid, e. g. acetic anhydride and acetyl chloride, the meso form of 3,4-di-(p-hydroxy-phenyl)-hexandiol-3,4 or the diester thereof may be transformed into the socalled hexadiene diester, e. g. hexadiene diacetate with a yield of 71 per cent. By saponifying the latter, 3,4-di-(p-hydroxy-phenyl)-hexadiene-2,4 is obtained. This hexadiene can be obtained from the racemic form of the named hexandiol in the same manner as just described for the meso form with a yield of 47 per cent. The 3,4-di-(p-hydroxy-phenyl)-hexandiol-3,4, described by Dodds, is composed of about equal parts of the meso and the racem form; by separately working up the meso and the racem form, a total yield of about 64 per cent may be arrived at, whereas the working up of the mixture of the isomers, as hitherto known, only yields 25-30 per cent of the hexadiene.

The separation of the isomeric mixture is best effected by esterifying the 3,4-di-(p-hydroxy-phenyl)-hexandiol-3,4 with acetic anhydride. Thereby, the 3,4-di-(p-acetoxy-phenyl)-hexandiol is formed, the meso form of which precipitates during the cooling of the excess acetic anhydride, the racem form remaining in solution. The isomeric diacetates formed can be transformed directly into hexadiene diacetate and, by subsequent saponification, into free hexadiene.

The hexadiene and the diesters thereof are used in therapy as highly active synthetic oestrogenes of very low toxicity.

In the following example the parts are parts by weight.

*Example*

10 parts of crude 3,4-di-(p-hydroxy-phenyl)-hexandiol-3,4 (obtained by reduction of p-hydroxy-propiophenone) are boiled with 40 parts by weight of acetic anhydride during 20 minutes. After the solution has cooled down, the meso form of 3,4-di-(p-acetoxy-phenyl)-hexandiol-3,4 having its melting point at 208-210° C. may be filtered off. The racem form is obtained by concentrating the mother liquor to dryness. Its melting point is found at 83-84° C. after recrystallisation from alcohol.

10 parts of the meso form or of the racem form of 3,4-di-(p-acetoxy-phenyl)-hexandiol-3,4 are boiled under reflux during 4 hours with 50 parts of acetic anhydride and 50 parts of acetyl chloride. After working up the reaction mixture, hexadiene diacetate of melting point 122-123° C. is obtained. By hydrolysing, it may be converted into the free 3,4-di-(p-hydroxy-phenyl)-hexadiene-2,4 melting at 226-228° C.

I claim:

1. A process for the manufacture of 3,4-di-(p-hydroxy-phenyl)-hexadiene-2,4 which comprises separating 3,4-di-(p-hydroxy-phenyl)-hexandiol-3,4 into the meso and racemic forms by fractional crystallization of an ester thereof with a lower aliphatic acid, dehydrating at least one of said forms separately to eliminate two mols of water therefrom, and hydrolyzing the compound obtained.

2. Process for the manufacture of 3,4-di-(p-hydroxy-phenyl)-hexadiene-2,4, comprising treating 3,4-di-(p-hydroxy-phenyl)-hexandiol-3,4 with the anhydride of a lower aliphatic carboxylic acid, crystallizing in fractions meso and racemic 3,4-di-(p-lower acyl-oxypheny)-hexandiol-3,4, respectively, from the reaction mixture, dehydrating each of the said forms separately with the anhydride and the chloride of a lower aliphatic carboxylic acid to remove two mols of water and hydrolyzing the compound obtained.

3. A process for the manufacture of 3,4-di-(p-hydroxy-phenyl)-hexadiene-2,4 which comprises dehydrating meso 3,4-di-(p-lower acyl-oxyphenyl)-hexandiol-3,4 with the anhydride and the chloride of a lower aliphatic carboxylic acid to remove two mols of water and hydrolyzing the compound obtained.

4. A process for the manufacture of 3,4-di-(p-hydroxy-phenyl)-hexadiene-2,4 which comprises dehydrating racemic 3,4-di-(p-lower acyl-oxyphenyl)-hexandiol-3,4 with the anhydride and the chloride of a lower aliphatic carboxylic acid to remove two mols of water and hydrolyzing the compound obtained.

5. Process for the manufacture of 3,4-di-(p-hydroxy-phenyl)-hexadiene-2,4 which comprises treating 3,4-di-(p-hydroxy-phenyl)-hexandiol-3,4 with acetic anhydride, crystallizing in fractions meso and racemic 3,4-di-(p-acetoxy-phenyl)-hexandiol-3,4, respectively, from the reaction mixture, dehydrating each form separately with acetic anhydride and acetyl chloride to remove two mols of water and hydrolyzing the compound obtained.

6. A process for the manufacture of 3,4-di-(p-hydroxy-phenyl)-hexadiene-2,4 which comprises dehydrating meso 3,4-di-(p-acetoxy-phenyl)-hexandiol-3,4 with acetic anhydride and acetyl chloride to remove two mols of water and hydrolyzing the compound obtained.

7. A process for the manufacture of 3,4-di-(p-hydroxy-phenyl)-hexadiene-2,4 which comprises dehydrating racemic 3,4-di-(p-acetoxy-phenyl)-hexandiol-3,4 with acetic anhydride and acetyl chloride to remove two mols of water and hydrolyzing the compound obtained.

ERICH ADLER.

REFERENCES CITED

The following references are of record in the file of this patent:

Dodds, Nature, 141, pages 247–248 (1938).

Dodd et al., "Proceedings of the Royal Society," Series B, vol. 127, pages 140–166 (1939).

Hobday, Jour. Chem. Soc., London, 1943, pages 609–612.